United States Patent [19]

van Dongeren

[11] 4,305,899

[45] Dec. 15, 1981

[54] METHOD OF MANUFACTURING A PLASTIC TUBE WITH LONGITUDINAL CHANNELS IN THE WALL

[75] Inventor: Jan P. van Dongeren, Bergentheim, Netherlands

[73] Assignee: Wavin B.V., Em Zwolle, Netherlands

[21] Appl. No.: 148,364

[22] Filed: May 9, 1980

Related U.S. Application Data

[60] Division of Ser. No. 73,613, Sep. 10, 1979, and a continuation of Ser. No. 893,826, Apr. 6, 1978, abandoned.

[30] Foreign Application Priority Data

Apr. 6, 1977 [NL] Netherlands .......................... 7703820

[51] Int. Cl.³ ............................................. B29F 3/08
[52] U.S. Cl. ...................................... 264/25; 264/26; 264/519; 264/565; 264/209.4; 264/210.5; 264/235; 264/237; 264/327; 264/346
[58] Field of Search ...................... 264/40.1, 563–569, 264/237, 519, 234–235, 209, 210.5, 25, 27, 26, 209.1, 521, 209.4, 522, 209.3, 519–520, 327; 138/114, 111

[56] References Cited

U.S. PATENT DOCUMENTS

| | | | |
|---|---|---|---|
| 3,274,315 | 9/1966 | Kawamura | 264/177 R |
| 3,372,920 | 3/1968 | Corbett | 264/173 |
| 3,507,939 | 4/1970 | Williams et al. | 264/237 |
| 3,663,134 | 5/1972 | Coquelin | 264/237 |
| 3,668,288 | 6/1972 | Takahashi | 264/209.4 |
| 3,907,961 | 9/1975 | Carrow | 264/237 |
| 3,941,157 | 3/1976 | Barnett | 138/115 |
| 4,088,724 | 5/1978 | Kuhnert | 264/237 |

FOREIGN PATENT DOCUMENTS

| | | | |
|---|---|---|---|
| 1914255 | 10/1970 | Fed. Rep. of Germany | 264/40.1 |
| 1775674 | 12/1970 | Fed. Rep. of Germany | |
| 485730 | 10/1953 | Italy | |
| 580728 | 8/1958 | Italy | |
| 6510582 | 2/1967 | Netherlands | |

*Primary Examiner*—Jeffery R. Thurlow
*Attorney, Agent, or Firm*—Wigman & Cohen

[57] ABSTRACT

This invention relates to a method of making a tube of thermoplastic material, comprising longitudinal channels of circular cross-section and having such wall stresses that, after axially cutting the tube, the edge parts along the cut edge overlap each other for less than 8% of the outer circumference of the tube.

8 Claims, 5 Drawing Figures

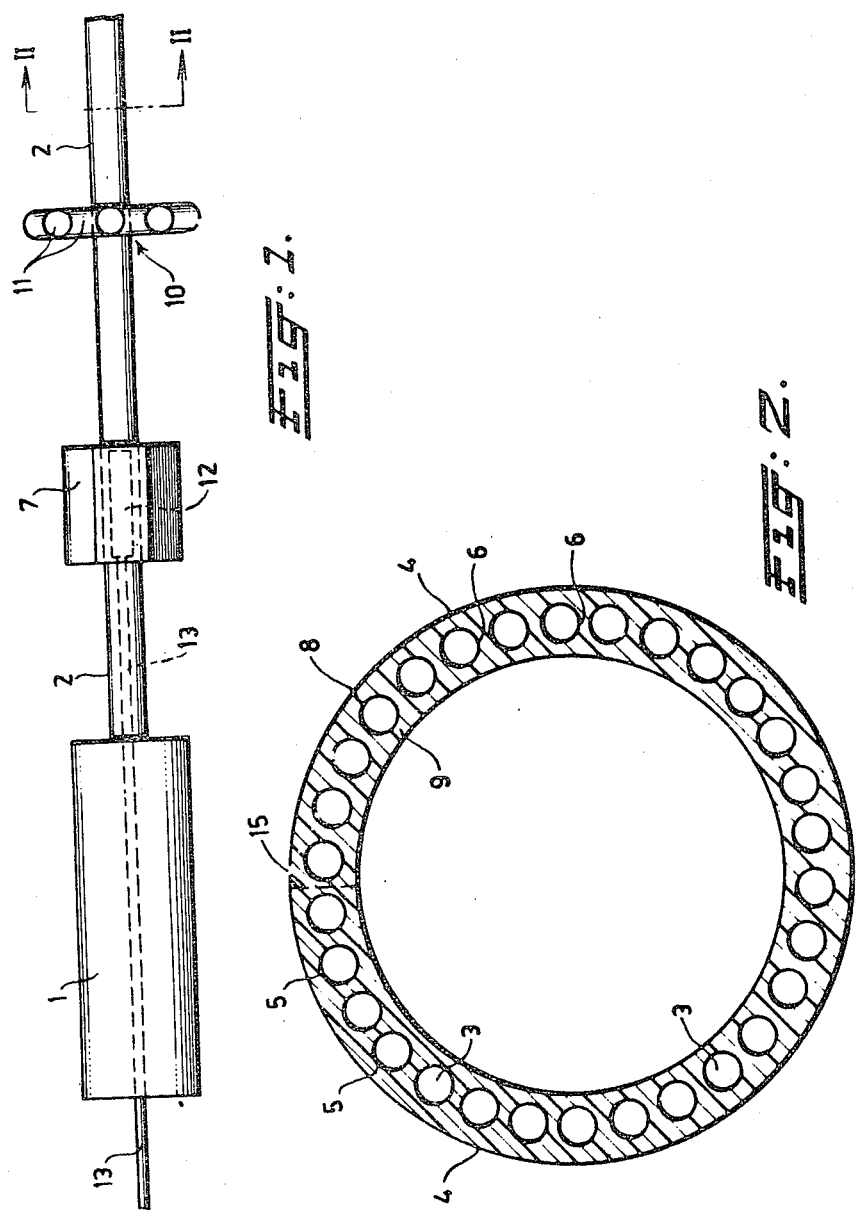

4,305,899

METHOD OF MANUFACTURING A PLASTIC TUBE WITH LONGITUDINAL CHANNELS IN THE WALL

CROSS REFERENCE TO RELATED APPLICATION

This is a division of U.S. patent application Ser. No. 073,613, filed Sept. 10, 1979, being a continuation of U.S. patent application Ser. No. 893,826, filed Apr. 6, 1978 now abandoned.

BACKGROUND OF THE INVENTION

The invention relates to a method of making a tube of thermoplastic material comprising an inner wall and an outer wall being interconnected by partitions, thereby forming longitudinal channels which are interspaced along the circumference, said channels having a rounded cross-section.

By a rounded cross-section is meant either a circular or an ellipsoidal cross-section, as well as other types of cross-sections with four bent walls and rounded corner transitions.

A plastic tube of this type, the wall of which comprises longitudinal channels presenting a circular cross-section, is known per se. Said tubes are manufactured by extruding a plasticized thermoplastic material, such as polyvinylchloride, through an extrusion nozzle. These longitudinal channels are regularly subdivided along the circumference and the distance between two adjacent channels is preferably equal to the distance of the outer surface of the tube to the nearest wall of a channel.

Said known tubes have the drawback that, when a sharp tool hits the front side of the plastic tube, a tear will be formed and this tear will then increase and extend along the whole length of the tube, so that the tube is useless.

Said tears are due to the fact that, the outer side of an extruded plastic tube is cooled down, whereafter, in a later stage, the inner wall, being interconnected with the outer wall, shrinks owing to cooling. Owing thereto, pressure tensions will occur in the outer wall, thereby causing tensile stresses in the inner wall of the tube.

Though attempts have been made to obviate this difficulty by using very specific types of plastics, said difficulties cannot be eliminated in this way.

SUMMARY OF THE INVENTION

The aim of the present invention is now to provide for the manufacture of a plastic tube of the aforementioned type, which does not have said drawbacks.

This is achieved, in accordance with the invention, by a manufacturing method for a tube having such wall stresses that, after axial cutting of the plastic tube, the overlapping of the edge parts along the cut edge amounts to less than 8% of the total outer circumference of the plastic tube.

Overlapping means the distance between the cut edge when the edge parts of the plastic tube overlap each other. The invention also relates to manufacturing methods for tubes, however, which do not show any overlapping after axial cutting of the tube. It may even occur that a slit may be formed after axial cutting without any overlap.

It has been found, e.g., that a polyvinylchloride tube will have a diameter of 315 mm and a wall thickness of 3 mm, after overlapping of the parts along the cut edge of less than 2 cm. The stress in the wall, required for extension of a tear, will be below a critical value. A blow with a sharp tool upon the front side of the tube will then not result in an extension of or increase in a tear along the length of the tube and will not cause damage to the inner wall of the tube.

The latter phenomenon will, however, occur anyway when the overlapping is considerably more than 20 mm in that case.

In a plastic tube manufacturing method carried out in accordance with the invention, a rounded cross-section of the longitudinal channels may be flattened at the side belonging to the outer wall.

This phenomenon is obtained by subjecting plastic tubes of this type to a particular heat treatment so as to give the inner wall a tensile stress below a desired lower limit.

The tensile stress in the inner wall of a plastic tube is such that, when the tube is cut through axially, parts of the edges along the cut edge will overlap each other for less than 8% of the outer circumference of the tube and mostly about 4%.

The invention further relates to a method of forming a plastic tube of thermoplastic material, comprising an inner and an outer wall being interconnected by means of partitions, thereby forming longitudinal channels, which are interspaced along the circumference, said channels having a rounded cross-section, by extruding a plastic material, sizing the tube and cooling said tube, wherein the tube is cooled evenly such that a tube is obtained having such wall stresses that, after axial cutting, the overlap of the edge parts along the cut edge amounts to less than 8% of the total outer circumference of the plastic tube.

According to another embodiment of the method of the invention, a formed tube is reheated to a temperature ranging from 35° to 100° C. such that a tube is obtained having such wall stresses that, after axial cutting, the overlap of the edge parts along the cut edge amounts to less than 8% of the total outer circumference.

This method, according to the invention, is carried out by heating a surface of the outer wall of a plastic tube of ambient temperature to above the plasticizing temperature, but below the glass transition temperature of the plastic.

By applying these measures, the E-modulus of the outer wall will decrease considerably and consequently the stress or stretch in the inner wall, which is maintained at ambient temperature and has an E-modulus of 30,000 kg/cm$^2$, will be decreased very substantially.

When the outer wall of the plastic tube is cooled down to a temperature of 20° C., said outer wall will shrink and, owing thereto, the stresses in the inner wall will decrease even more.

The outer surface of the outer wall of the plastic tube is appropriately heated to a temperature ranging between 70° to 80° C., mostly within a period of 0.2 to 2 minutes. The outer wall is heated to an average temperature ranging from 50° to 65° C.

The surface temperature of the outer wall of the tube should be maintained below the temperature at which the tube will attain flat sides above the longitudinal channels. This critical surface temperature varies from 80° to 85° C.

In a further embodiment of the method according to the invention, the tube is subjected to the action of a heated medium transferred through the channels, whereby the temperature of said medium, which is mostly heated air, varies between 35° to 100° C.

In this way the partitions of the tube may be formed in order to remove the stresses within the tube walls.

Advantageously, the tube may also be heated along its whole cross-section and the inner and outer sides are then simultaneously gradually cooled down. During said gradual cooling, the above-mentioned limits should be met.

The same effect can be attained by homogeneously cooling the still warm extruded tube at the inner side and outer side.

The stresses, as present in the tube, can also be removed by capacitively heating the tube.

BRIEF DESCRIPTION OF THE DRAWINGS

FIG. 1 shows an apparatus for obtaining a tube according to the inventive method;

FIG. 2 shows a cross-section of a tube made according to the inventive method;

DESCRIPTION OF PREFERRED EMBODIMENTS

Figure 3:
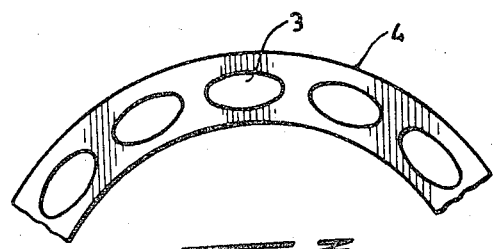
FIG. 3 shows part of a wall of a tube made according to the inventive method with channels having an ellipsoidal cross-section.

As shown in FIG. 1, a polyvinylchloride tube 2 is extruded by an extruder 1, said tube having an outer diameter of 315 mm and a wall thickness of 8 mm. In FIG. 2, the longitudinal channels 3 in the wall have a diameter of 5 mm. The distance between two adjacent channels amounts to 1.8 mm and the distance from the outer wall 8 of the plastic tube to the nearest wall 5 of the longitudinal channel 3 is equal to the distance between the wall 5 of the channel 3 and the wall 6 of a successive channel 3 in the axis of the wall. The channels 3 are equidistantly grouped along the circumference.

After extrusion, the tube 2 is passed through a sizing box 7, and is further cooled down to ambient temperature.

As the outer wall 8 of the tube 2 will be cooled first by means of the cooling of the sizing box 7, the outer wall 8 will obtain a high E-modulus, for example of 30,000 kg/cm$^2$, whereas owing to the later cooling of the inner wall 9 of the tube 2, the inner wall 9 will be subjected to a more excessive tensile stress.

When a sharp tool hits the inner wall 9 of a tube 2 of this type, a tear will be produced, which rapidly increases along the whole length of the tube 2.

So as to obviate this phenomenon, it is essential that the energy released from a certain volume of plastic should be smaller than the energy required for the extension of the tear.

In order to reach this aim, the polyvinylchloride tube 2 is now passed to a heated zone 10, wherein the outer surface of the outer wall 8 of the tube 2 is exclusively heated. To that end, surface radiation means 11 can be used which will heat the surface of the outer wall to a temperature of about 80° C. Thus, the average temperature of the outer wall 8 will range from 50° to 65° C.

A quick heating of the outer surface of the outer wall 8 of a tube 2 is essential. "Quick" is here to be understood as a period of less than 5 minutes, that is, ranging from 0.2 to 2 minutes. Heating of the outer surface is to a temperature of 75° to 80° C. and, preferably, from 68° to 75° C.

By heating the outer wall 8 of the plastic tube 2, tensile stresses in the inner wall 9 of the tube 2 will be decreased, such that the stressed inner wall 9 will have a decrease in tensile stresses of about 50 to 75% and subsequent cooling of the outer wall 8 implies that the tensile stresses will be balanced still further, so that, after completion of the heat treatment, the inner wall 9 will be no longer subjected to tensile stresses.

The result of the heat treatment appears from the following experiment.

EXAMPLE I

Figure 5:
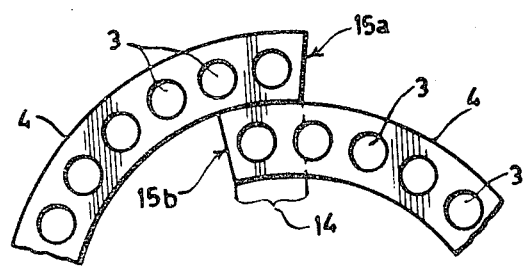
FIG. 5 shows the overlap of the edge parts along the cut edge of a tube made according to FIG. 2.

An extruded tube 2, cooled to ambient temperature, as hereinbefore indicated, which tube 2 was not subjected to subsequent heating, will show an overlapping of the edge parts 15a and 15b along the cut edge 15 of 5 to 7 cm. An overlap 14 is shown in FIG. 5 and means the distance between the edge parts 15a and 15b, when the tube 2 is cut through at cut edge 15 in FIG. 2. In a combined notch-impact-action, the tube 2 will show the phenomenon of tear extension. Such a tear extension will particularly occur when a nonsupported part of such a tube 2 is sawed off.

After the heat treatment, the overlapping 14 amounts to be less than 2 cm, in which case, the step of subjecting the tube 2 to a combined notch-impact-action causing damage will no longer lead to an extension of a tear in the inner wall 9 of the tube 2.

It should be noted that the temperature during heating of the outer wall 8 should be such that the plasticizing temperature of the plastic material is exceeded, but that said temperature remains below the glass transition temperature of the plastic material.

EXAMPLE II

A tube 2 is extruded like in Example I and cooled at the outside with a sizing box 7 and at the inside with a cylindrical body 12 fed with cooling water through line 13. The cooling by means of the sizing box 7 and the body 12 is carried out simultaneously.

The tube 2, as produced, shows an overlapping of only 2 cm and a tear formed in the inner wall 9 will not increase in length.

When tubes 2 are used having a diameter of 200 mm, there will be no tear extension at an overlapping of 15 mm.

When tubes 2 are used having a diameter of 250 mm, there will be no tear extension at an overlapping of 22 mm.

Figure 4:
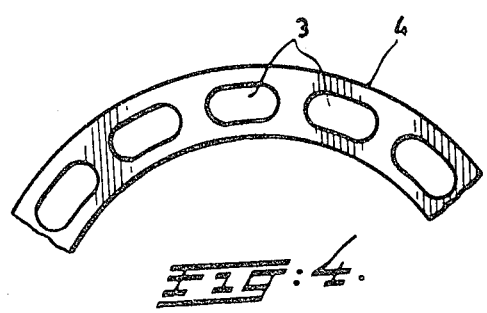
FIG. 4 shows part of a wall of a tube made according to the inventive method with channels presenting another cross-section.

As shown in FIG. 3, the channels 3 of rounded cross-section may have the shape of an ellipse or a rounded cross-section, as shown in FIG. 4.

What is claimed is:

1. A method of manufacturing a tube of thermo-plastic material having an inner wall and an outer wall being interconnected by partitions thereby forming longitudinal channels which are interspaced along the circumference of the tube, comprising the steps of:
   extruding a plastic material,
   sizing the tube and cooling said tube to a temperature distribution whereby the tube is form stable, and thereafter reheating the outer wall of the tube to a temperature over 50° C. by applying heat from the outside such that the tube is not form-destabilized, such that a tube is obtained wherein the internal stresses are such that, after axial cutting of the tube, the overlap of the edge parts along the cut edge of the tube amounts to less than 8% of the total circumference of the tube.

2. The method of claim 1 wherein the step of:
reheating the outer wall of the formed tube is done to a temperature ranging from over 50° C. to 100° C. by applying heat from the outside.

3. The method of claim 1, comprising the step of maintaining the inner wall of the formed tube at about ambient temperature.

4. The method of claim 1, further comprising the step of heating the tube so that the average temperature of the outer wall ranges from 50° to 65° C.

5. The method of claim 1, further comprising the step of heating the tube so that the outer surface of the outer wall is heated to a temperature ranging from 70° to 85° C.

6. The method of claim 1, further comprising the step of heating the tube so that the surface of the outer wall is quickly heated within a period of less than 5 minutes, preferably within a period of 0.2 to 2 minutes.

7. The method of claim 1, further comprising the step of heating the tube capacitively.

8. The method of claim 1, wherein the thermoplastic material is polyvinylchloride.

* * * * *

UNITED STATES PATENT AND TRADEMARK OFFICE
CERTIFICATE OF CORRECTION

PATENT NO. : 4,305,899
DATED : December 15, 1981
INVENTOR(S) : Jan P. van Dongeren It is certified that error appears in the above—identified patent and that said Letters Patent is hereby corrected as shown below:

Column 1, line 39, after "fact that," insert --first,--.

Column 4, line 66, after "said tube" insert --evenly--.

Column 6, lines 1, 4, 8, and 12, delete "further".

Signed and Sealed this

Fourth Day of May 1982

[SEAL]

Attest:

Attesting Officer

GERALD J. MOSSINGHOFF
Commissioner of Patents and Trademarks